US008429408B2

(12) United States Patent
Vanstone

(10) Patent No.: US 8,429,408 B2
(45) Date of Patent: Apr. 23, 2013

(54) MASKING THE OUTPUT OF RANDOM NUMBER GENERATORS IN KEY GENERATION PROTOCOLS

(75) Inventor: Scott Alexander Vanstone, Campbellville (CA)

(73) Assignee: Certicom Corp., Mississauga, Ontario (CA)

(*) Notice: Subject to any disclaimer, the term of this patent is extended or adjusted under 35 U.S.C. 154(b) by 343 days.

(21) Appl. No.: 12/814,210

(22) Filed: Jun. 11, 2010

(65) Prior Publication Data

US 2011/0307698 A1    Dec. 15, 2011

(51) Int. Cl.
*H04L 9/00* (2006.01)

(52) U.S. Cl.
USPC ............. 713/171; 713/156; 713/168; 380/28; 380/30; 380/44; 380/278

(58) Field of Classification Search .................. 713/171, 713/156, 168; 380/28, 30, 44, 278
See application file for complete search history.

(56) References Cited

U.S. PATENT DOCUMENTS

| | | | |
|---|---|---|---|
| 2002/0057796 A1* | 5/2002 | Lambert et al. ................. | 380/28 |
| 2004/0249817 A1* | 12/2004 | Liu et al. ............................ | 707/9 |
| 2005/0114651 A1* | 5/2005 | Qu et al. ........................ | 713/156 |
| 2005/0235148 A1* | 10/2005 | Scheidt et al. ................ | 713/168 |
| 2006/0104447 A1* | 5/2006 | Lauter et al. ................... | 380/258 |
| 2007/0100762 A1* | 5/2007 | Luo et al. ......................... | 705/59 |
| 2009/0041238 A1* | 2/2009 | Qu et al. .......................... | 380/44 |
| 2009/0046852 A1* | 2/2009 | Vanstone ......................... | 380/30 |
| 2009/0086968 A1* | 4/2009 | Vanstone ......................... | 380/44 |
| 2009/0161876 A1* | 6/2009 | Sherkin ........................ | 380/278 |
| 2011/0087883 A1* | 4/2011 | Campagna et al. ........... | 713/156 |

OTHER PUBLICATIONS

Yoon, Eun-Jun et al.; "An Optimizing Authenticated Key Exchange Protocol for Self-organizing Sensor Networks"; Jan. 1, 2006; pp. 537 to 546;Ubiquitous Computing systems; LNCS; ISBN: 978-3-540-46287-3.
Huang, Qiang et al.—Association for Computing Machinery; "Fast Authenticated Key Establishment Protocols for Self-Organizing Sensor Networks"; ACM WSNA 2003; Proceedings of the $2^{ND}$ ACM International Workshop on Wireless Sensor Networks & Applications; NewYork; Jan. 1, 2003; pp. 141-150; ISBN: 978-58113-764-4.
Brown, D.R.L. et al.; "Provably Secure Implicit Certificate Schemes"; Financial Cryptography; Jan. 1, 2002; pp. 156 to 165; vol. 2339; ISBN: 978-3-540-24128-7.
Manet, Pascal; Search Report from European Application No. 10165765.8; search completed Oct. 29, 2010.

* cited by examiner

*Primary Examiner* — Beemnet Dada
*Assistant Examiner* — Sayed Beheshti Shirazi
(74) *Attorney, Agent, or Firm* — Etienne de Villiers; Dimock Stratton LLP

(57) ABSTRACT

To mitigate the effects of a weak random number generator (RNG) in a public key cryptosystem, a public key obtained from the RNG is encrypted using a deterministic cryptographic scheme before being made publicly available. A trusted party receiving the encrypted public key can recover the public key and combine it with other information so it is not subject to direct scrutiny. In one embodiment, the trusted party incorporates the public key in a certificate, such as an implicit certificate, for use by the correspondents in other communications.

9 Claims, 5 Drawing Sheets

MASKING THE OUTPUT OF RANDOM NUMBER GENERATORS IN KEY GENERATION PROTOCOLS

TECHNICAL FIELD

The following relates generally to the field of cryptography.

BACKGROUND

As communications have progressed into the electronic domain, information has become easy to copy and disseminate. The prevalence of electronic communication has made for many productivity advances, and an increase in knowledge and information sharing. However, due to the ease of dissemination, there is an ever increasing need for privacy and authentication in electronic communications.

To retain privacy, the method of encrypting data using a key is very well known. In asymmetric key cryptographic protocols, computing devices, commonly referred to as correspondents, share a common secret key. This key must be agreed upon by the correspondents, and its secrecy maintained throughout the data communication.

Public key cryptographic protocols were first proposed in 1976 by Diffie-Hellman. A public-private key pair is created for each correspondent, with the public key made available to other parties, and the private key information maintained secret by the correspondent who will be the recipient of messages. Any message encrypted using the public key of a recipient can only be decrypted using the private key of that same recipient. The private key cannot be derived from the knowledge of the plaintext, ciphertext and public-key.

Cryptographic systems utilise protocols that are based on so called "hard" problems. These problems can be formulated quickly, but do not have efficient solution algorithms. Problems such as integer factorization and the discrete logarithm problem fall into this category.

Integer factorisation is the basis of a set of protocols known as RSA which uses, as a modulus n, the product of two large primes, p, q. A second modulus $\Phi$ is computed as $(p-1)(q-1)$. A random integer e is selected so that $1 < e < \Phi$ and $\gcd(e,1)=1$. A value d is selected so that $1 < d < \Phi$ and $ed = 1 \mod \Phi$. A correspondent's public key is then $(n,e)$ and the corresponding private key is d.

To send a message to a correspondent, the recipient's public key $(n,e)$ is obtained and the message represented as an integer m in the interval $[0,n-1]$. The ciphertext c of message m is computed as $c = m^e \mod n$ and sent to the recipient correspondent. The recipient can decrypt and recover the plaintext from c by computing $m = c^d \mod n$.

The RSA algorithm is a deterministic algorithm requiring the selection of the large primes p, q. However, as integer factorisation techniques have improved, it has become necessary to use larger moduli, and, consequently, the computational efficiency has decreased.

The discrete log problem forms the basis for discrete log cryptographic systems that include Diffie Hellman key agreement protocols and ElGamal encryption and signature schemes. The problem is expressed as follows: given a finite cyclic group G of order n, a generator a of the group G, and an element $\beta$ of the group G, find the integer x such that $\alpha^x = \beta$. Knowing the values $\alpha$, $\beta$ and the group G, it is considered infeasible to determine the integer x provided the number of elements n in G satisfies certain properties. In practical implementations, a random number generator is used to generate the random integer x, and the integer x is used as a private key by the correspondent. A corresponding public key is computed as $\alpha^x$ and distributed publically to other correspondents. The public and private keys are used according to well known protocols to encrypt and decrypt messages sent between parties, to authenticate a message signed by one party using a private key, or to establish a common key between the parties by combining the public key of one party with the private key of another.

These protocols can be implemented practically in any group in which both the discrete logarithm problem is hard and the group operation is efficient. One example of such a group is the elliptic curve cyclic group defined over the finite field $F_p$ composed of integers from 0 to $p-1$, where p is a prime number. The group elements are points lying on a defined elliptic curve and having coordinates that are elements of the underlying field. An elliptic curve group typically utilises an additive notation, rather than the multiplicative notation used above, so that a k-fold group operation of a point P requires the point P to be added k times and is written kP. A cryptographic system implemented using an elliptic curve group is known as an elliptic curve cryptographic system, or ECC. Other groups commonly used are multiplicative groups, such as the non-zero integers $F_p$ and the corresponding k-fold group operation is denoted $\alpha^k$, where $\alpha$ is a generator of the group.

Although the discrete log problem is considered intractable, the security of the cryptographic system depends on the cryptographic strength of the random number x. A random number generator (RNG) is designed to provide cryptographically strong random numbers, but, due to malfunction, poor selection of a seed, or malicious tampering, the RNG may output relatively weak random numbers. This is a particular problem in constrained devices, such as cell phones and smart cards, where low cost implementations may not have sufficient entropy to provide a robust random number generator. As a result, publication of the public key may inadvertently disclose the corresponding private key, and, depending on the protocol implemented, may in turn yield information pertaining to other private keys used in the protocol.

BRIEF DESCRIPTION

The following shows an embodiment of a key establishment protocol by way of example only with reference to the appended drawings wherein.

DETAILED DESCRIPTION

Figure 1:
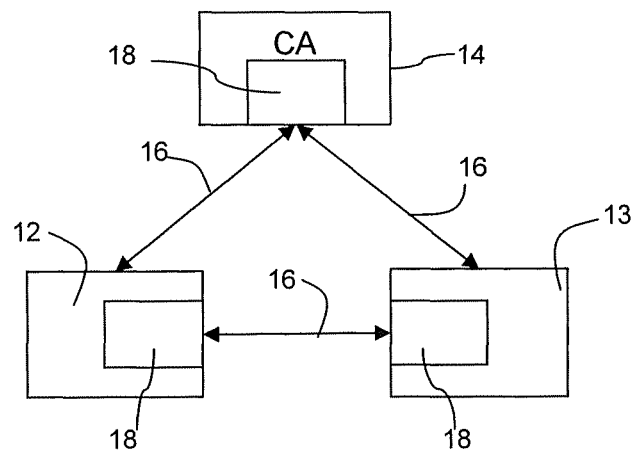
FIG. 1 is a schematic representation of a data communication system.

In general terms, the following provides a technique for masking the output of a random number generator (RNG). In one embodiment, the output of this RNG is used by a correspondent as a private value, for example, an ephemeral private key. The correspondent then generates a corresponding public key. However, direct scrutiny of this public key (which could lead to exposure of the corresponding private value due to a weakness of the RNG) is avoided during transmission by encrypting the public key with a deterministic encryption scheme, such as RSA, before distributing the public key in a public manner. The deterministic encryption scheme does not rely on the output of the RNG for its strength and therefore effectively masks the public key and the private value used to generate the public key.

The encrypted public key is received by a trusted party who can decrypt it and recover the public key. The trusted party utilises the public key in combination with other information to avoid direct exposure of the public key to third parties. Preferably, the trusted party generates an implicit certificate that incorporates, but does not directly expose, the public key. The implicit certificate can then be used by the correspondent in communications with other correspondents.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Referring to FIG. 1, a data communication system includes a pair of correspondents 12, 13 connected by a communication link 16. The correspondents 12, 13, are connected through link 16 to a mutually trusted correspondent 14, that is referred to as a certifying authority (CA). The correspondents 12, 13 are computing devices, such as a personal computer, personal digital assistant, smart phone, cellular phone, ATM, Point of Sale device, server, entertainment system component, or other such device having a computing capability and the ability to exchange digital information with other correspondents. The CA 14 is also a computing device, typically a server with a secure module for maintaining keys and performing cryptographic processes. The CA 14 is itself connected to higher level CA's providing a trusted hierarchy in well known manner.

The communication link 16 may be a telephone link, wireless or landline, local area network (LAN), RF link, or other such link provided to transfer information between the correspondents. Although shown for illustrative purposes as direct connection between correspondents 12, 13 and CA 14, it will be appreciated that the communication link 16 may be part of a more extensive network and that the link may be routed through multiple correspondents in passing from correspondent 12 to correspondent 13 or CA 14.

Figure 2:
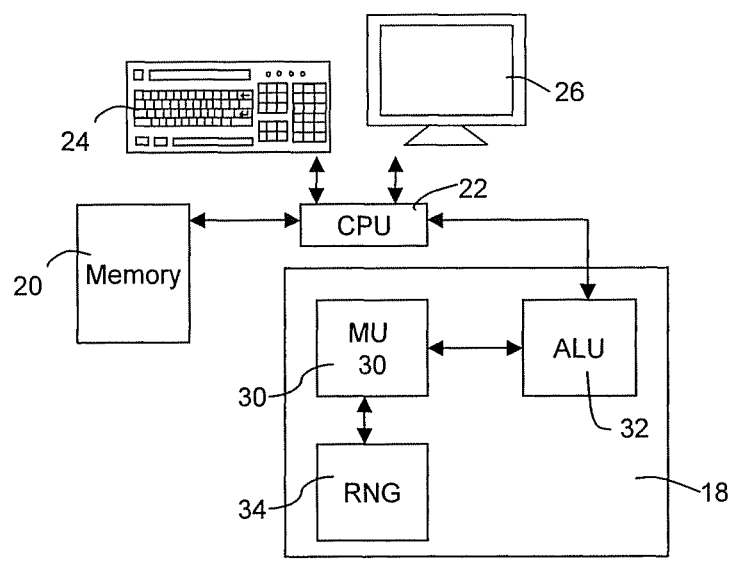
FIG. 2 is a representation of a cryptographic unit used in the system of FIG. 1.

Each of the correspondents 12, 13 and CA 14 is similar in operation when communicating over the link 16 and therefore only one will be described in detail. Referring therefore to FIG. 2, correspondent 12 includes a cryptographic unit 18 that communicates with a memory 20 and a processor 22. The correspondent may also include a data input unit 24, such as a keypad or card reader, and a display device, 26, depending on the intended purpose of the correspondent 12.

The cryptographic unit 18 is provided to manage secure communications between the correspondents 12, 13 and CA 14 over the communication link 16. The cryptographic unit 18 includes a secure memory 30, which may be part of the memory 20 or a separate memory module, and an arithmetic logic unit (ALU), 32, that operates under the control of the processor 22 to perform arithmetic operations necessary to implement a chosen cryptographic protocol. The processor 22 includes one or more instruction sets to implement respective protocols.

It will be appreciated that any module or component exemplified herein that executes instructions may include or otherwise have access to non-transient computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the cryptographic unit or accessible or connectable thereto. Any application or module herein described may be implemented using computer readable/executable instructions that may be stored or otherwise held by such computer readable media.

The memory 30 stores the parameters of the cryptographic schemes and protocols to be implemented by the cryptographic unit 18. In the present example, the cryptographic unit 18 may execute a program to implement a public key elliptic curve cryptographic system in which cryptographic protocols are implemented based on the intractability of the discrete log problem in an elliptic curve group defined over a finite field. The memory 30 therefore stores the generator point G, the parameters of the curve, and the order, n, of the elliptic curve group G.

The memory 30 will also store securely a long term or static private key q, and the corresponding public key Q (=kG).

The cryptographic unit 18 may also execute a deterministic cryptographic scheme, typically a RSA integer factorisation scheme, although other deterministic schemes could be used. The memory 30 therefore stores a private key, d, that has a corresponding public key (n, e). The memory 30 also stores the RSA public key (n', e') of the correspondent 13 and the public key (n", e") of the CA 14.

The cryptographic unit 18 may also execute a program to implement a symmetric encryption protocol utilising a shared secret key.

The cryptographic unit 18 also includes a random number generator 34, whose output is provided in a secure manner to memory 30 for use by the ALU 32. The ALU 32 uses the bit string as an input to a key derivation function (KDF) that outputs a session private key x, that is a bit string derived from the output of the random number generator 34. The session key x is stored securely in memory 30 and used by the ALU 32 in generating an ephemeral or session public key xG.

A session public key X corresponding to the session private key x is generated in the ALU 32 by performing an x-fold addition of the point G so that X=xG. This value is stored in memory 30. The computation is performed in the ALU 32 using point multiplication algorithms and the bit string representing the private key x. Suitable algorithms are well known in the art and described at section 3.3 of the *Guide to Elliptic Curve Cryptography*, Hankerson et al., Springer-Verlag, 2004 and so need not be described in further detail.

The memory 30 of the correspondent 13, and CA 14 will similarly have RNG's to generate respective session private keys y and z, and corresponding respective session public keys Y and Z, where Y=yG and Z=zG. Similarly, each of the correspondent 13 and CA 14 securely store RSA private keys (d), (d") respectively and distribute their public keys (n', e') (n", e").

The discrete log based protocols, such as those used in ECC, typically require the generation of key pair for each session and hence the use of the RNG 34 for each session. To mitigate the recovery of the ephemeral private key from the public key due to a weak RNG, the deterministic encryption scheme is used to blind the public key until such time as the ephemeral public key is masked by other computations.

In one embodiment, the correspondents 12, 13 implement via the link 16, an implicit certificate protocol using the respective cryptographic unit 18.

An implicit certificate protocol enables two correspondents to communicate without the recipient explicitly verifying a signature on a certificate of the sender's public key from the certification authority CA. The recipient receives an implicit certificate of the sender from which the recipient may recover the sender's ephemeral public key.

An example of such a protocol is that known as Elliptic Curve Qu-Vanstone (ECQV), and is described, for example, in the Standards for Efficient Cryptography publication "SEC 4: Elliptic Curve Qu-Vanstone Implicit Certificate Scheme".

Figure 3:
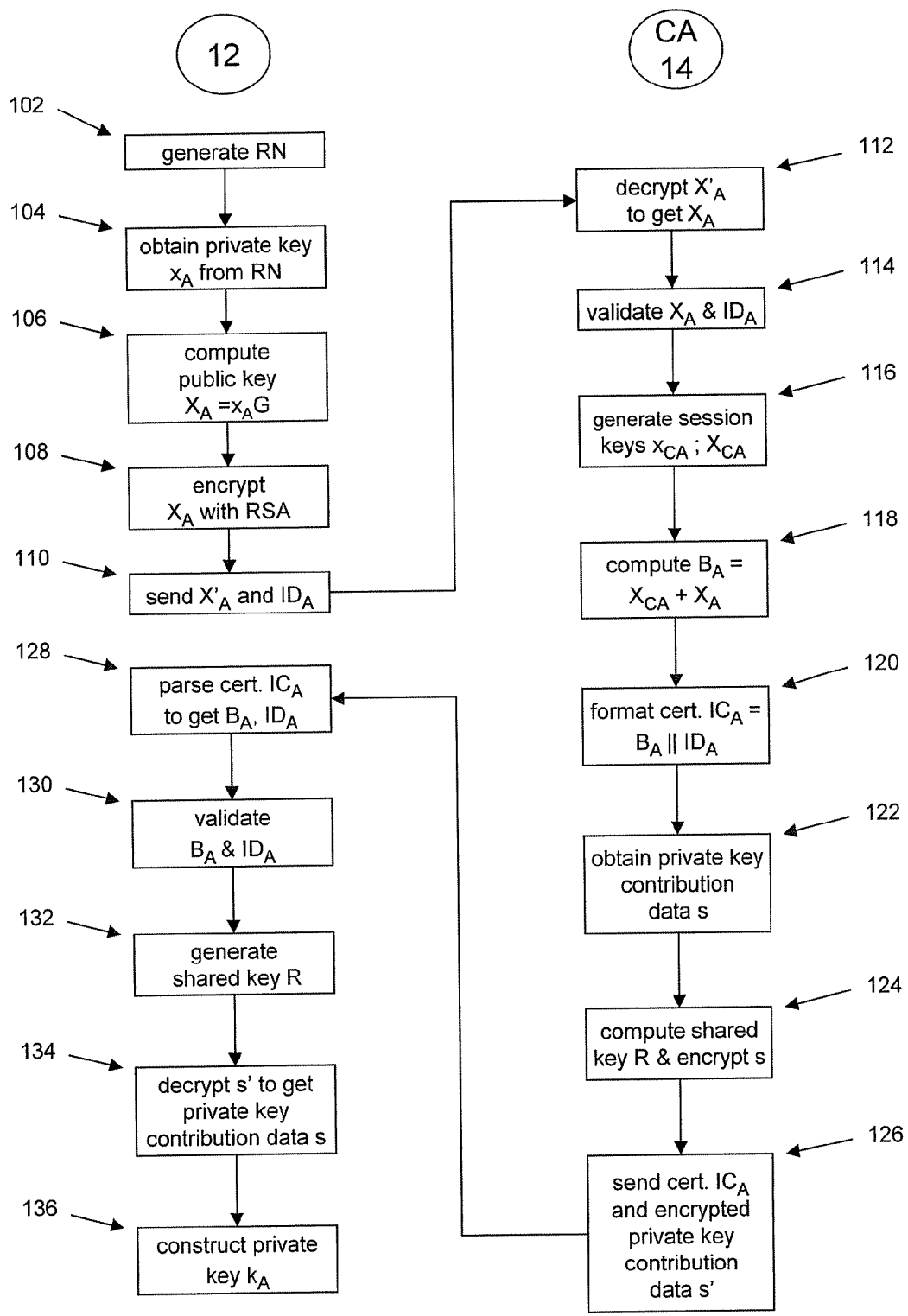
FIG. 3 is a schematic representation of the steps performed by the system of FIG. 1.
Figure 4:
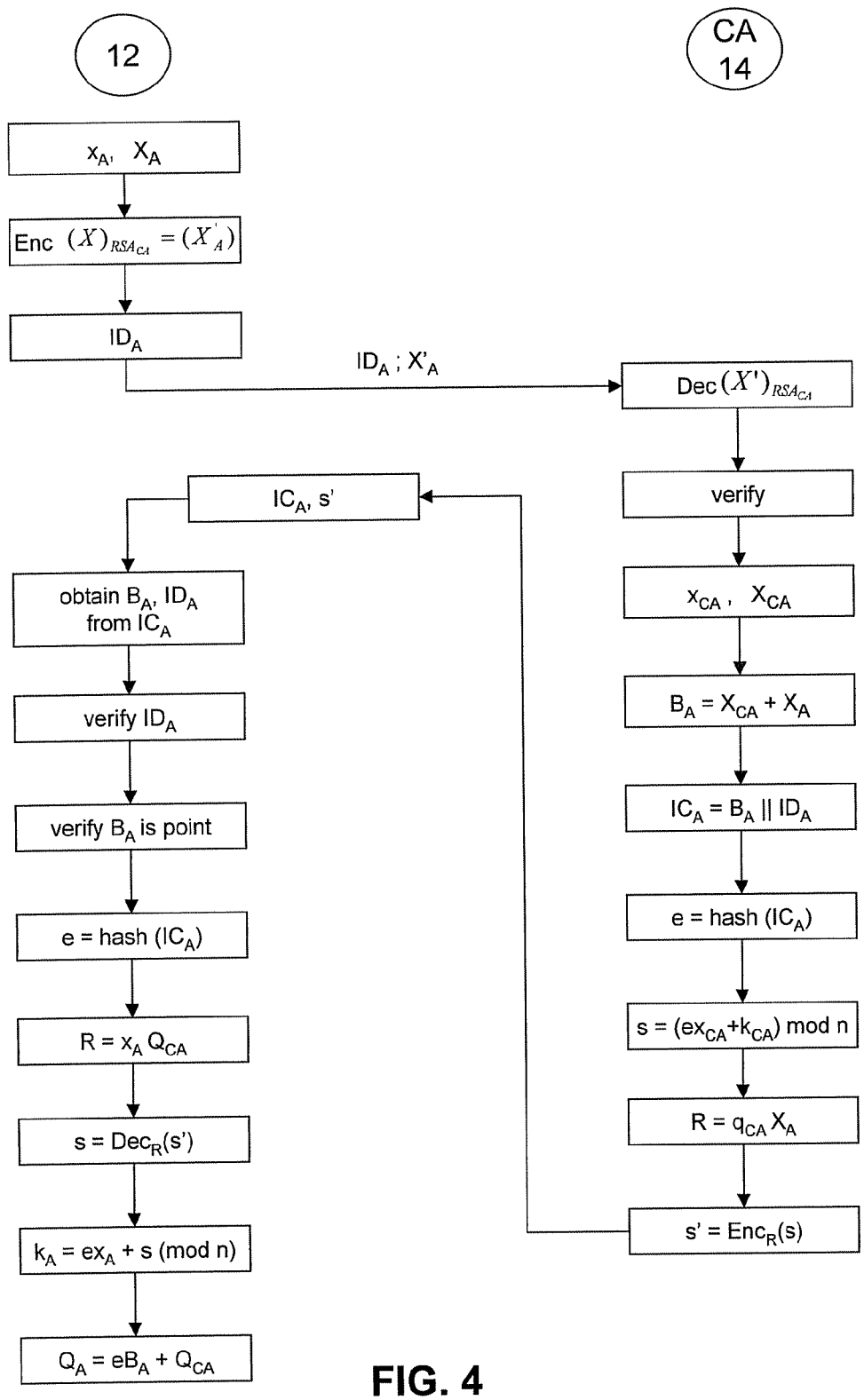
FIG. 4 is a schematic representation of the flow of information within the system of FIG. 1.

The initial step of such a protocol is to perform a certificate enrolment between the sender and the CA. The sequence of steps and the flow of information is shown in FIGS. 3 and 4 respectively.

For the purpose of the description, the parameters associated with correspondent 12 will be denoted with a suffix A, those with correspondent 13 will be denoted with a suffix B and those with the correspondent 14 with a suffix CA.

Each of the correspondents 12, 13 has, in its memory 30, a copy of the long term or static public key $Q_{CA}$ of the CA 14, and the CA 14 has the corresponding private key $k_{CA}$ securely stored in its memory 30.

Similarly, each of the correspondents 12, 13 has the RSA public key of the CA 14 stored in memory.

The correspondent 12 initiates the certificate enrolment by generating a random bit string at the output of the RNG 34 as indicated at step 102. At step 104 the cryptographic unit uses the RNG output as an input to a key derivation function, which may simply be a truncation of a bit string, to obtain a private value that in the illustrated embodiment is an ephemeral private key $x_A$.

The cryptographic unit 18 then computes (step 106) the corresponding public value, an ephemeral public key, using the base point G to obtain the point $x_A G = X_A$, which is to be used by the CA 14 to generate the implicit certificate and private key contribution data for correspondent 12.

To blind the ephemeral public key $x_A$, the cryptographic unit 18 uses, at step 108, the RSA public key (n",e") of the CA 14 to encrypt the ephemeral public key $X_A$ and obtain the encrypted message $X_A'$. The encrypted message $X_A'$, together with the identifying information, $ID_A$, of the correspondent 12 is sent over the link 16 to the CA 14 (step 110).

The CA 14 uses its RSA private, d", key to decrypt the message $X_A'$ and recover the ephemeral public key $X_A$. It will be apparent that any third party intercepting the message from the correspondent 12 will be unable to recover public key $X_A$ as the RSA private key remains secret to the CA 14. Moreover, the use of the deterministic cryptographic scheme does not require the use of the RNG 34, and therefore avoids the potential vulnerability if a weak RNG 34 is used.

Once the public key $X_A$ is recovered, at step 112, the cryptographic unit 18 of the CA 14 performs a validation to ensure the key $X_A$ satisfies the necessary criteria for a public key, e.g. that it is a point on the elliptic curve and is not an element of a small subgroup or the point at infinity. Similarly, the identity information, $ID_A$, is validated for content (step 114) and if both are found satisfactory the cryptographic unit 18 of the CA 14 proceeds to the next step, indicated at 116, and uses the RNG 34 in the CA 14 to generate an ephemeral private key $x_{CA}$. A corresponding public key $x_{CA}G = X_{CA}$ is then computed by the cryptographic unit 18 of the CA 14.

The ephemeral public keys $X_A$ and $X_{CA}$ are combined, as at step 118, to obtain a new point $B_A$ which is the public key reconstructions data for correspondent 12. The point $B_A$ is concatenated with the identification $ID_A$ of the correspondent 12, to provide an implicit certificate $IC_A$ (step 120).

At step 122, the private key contribution data, s, is generated by the cryptographic unit 18. This is done by hashing the certificate $IC_A$ using a cryptographically secure hash, such as SHA2, to obtain a value e. The private key reconstruction data s is obtained from $s = ex_{CA} + k_{CA}$ (mod n). The cryptographic unit 18 combines the values from the memory 30 performing integer arithmetic and modular reduction.

As s is the private key reconstruction data for the correspondent 12, it must be sent securely to the correspondent 12. This is done by generating a common key R from a combination of the long term private key $q_{CA}$ of the CA 14 and the ephemeral public key $X_A$ of the correspondent 12 (step 124). Thus $R = q_{CA} X_A = q_{CA} x_A G$. The correspondent 12 may generate the same key R from the private key $x_A$ and the long term public key $Q_{CA}$ of the CA 14 as $R = x_A Q_{CA} = x_A q_{CA} G$.

The shared key R is used by the cryptographic unit to encrypt the private key reconstruction data s using a symmetric encryption scheme to obtain the encrypted message s'.

The encrypted message s' and the implicit certificate $IC_A$ is then sent to the correspondent 12 over the link 16 (step 126)

The correspondent 12 initially parses the certificate $IC_A$ to obtain the public key reconstruction data, namely point $B_A$, and the identity information $ID_A$ (step 128). The identity information $ID_A$ and point $B_A$ are validated (step 130) and the shared key R obtained by computing $x_A Q_{CA}$, as indicated at 132.

The shared key R is used to decrypt the message s' and obtain s (step 134) from which the private key $k_A$ associated with the implicit certificate $IC_A$ can be obtained. The private key $k_A$ is obtained from $ex_A + s$ (mod n), where e is the hash of the certificate $IC_A$ (step 136). It will be noted that generation of R and $k_A$ requires the use of the ephemeral private key $x_A$ which is only known to the correspondent 12.

The certificate public key $K_A$ corresponding to the private key $k_A$ is computed as $K_A = eB_A + Q_{CA}$, using the value $B_A$ received in the certificate and the long term public key of the CA 14 that is stored in the memory 30 of the correspondent 12.

The public key $Q_A$ can therefore be computed by any correspondent, e.g. correspondent 13, who receives the implicit certificate $IC_A$ and has the public key of the CA 14.

To send information between correspondents 12 and 13 over the link 16 therefore, the correspondent 12 may use the key pair $k_A$, $Q_A$ and for example sign the information using $k_A$. The recipient 13 receives the signed information and the implicit certificate $IC_A$ and can recover the public key $Q_A$ by computing e from the certificate $IC_A$, parsing $B_A$ from the certificate $IC_A$, and using the public key $Q_{CA}$ of the CA 14.

During the certificate enrolment and the subsequent use of the implicit certificate, it will be noted that the public key $X_A$ obtained from the private key $x_A$ is not directly exposed to scrutiny. When initially sent to the CA 14, the public key $X_A$ is blinded by the encryption using a deterministic scheme which does not utilise the RNG 34.

The implicit certificate $IC_A$ provides the point $B_A$, which is a combination of the ephemeral keys $X_A$ and $X_{CA}$. The ephemeral key of the CA 14 is generated by the RNG of the CA, which can be assumed to provide an output that is cryptographically acceptable. Therefore the combination of the potentially vulnerable public key $X_A$ with the secure public key $X_{CA}$ masks the public key $X_A$ and inhibits retrieval of the private key $x_A$.

The shared key R, which uses the private key $x_A$, is maintained secret and therefore does not expose the private key $x_A$ to allow others to reconstruct the shared key R.

The embodiment shown in FIGS. 3 and 4 is only one specific embodiment. More generally, a method is contemplated for establishing a private key for use in a public key cryptographic system. The method is described with reference FIGS. 5 and 6, and it will be appreciated that the method can be performed by computing devices configured to perform the operations, or that FIGS. 5 and 6 can comprise a set of computer readable instructions executed by the computing devices.

First, in step 202, the device wishing to establish the private key obtains a private value from an output of the random number generator 34. Then, in step 204, a corresponding public key is computed from the private value.

Next, in step 206, the corresponding public key is encrypted using a deterministic encryption scheme to establish an encrypted public key, and in step 208 the encrypted public key is forwarded to a computing device acting as a trusted party.

In step 210, the device receives from the trusted party encrypted private key reconstruction data. In step 212, a decryption key is used to recover the private key reconstruction data, and in step 214, the private key is computed from the private key reconstruction data. The private key is a discrete log private key corresponding to a discrete log public key made publicly available. This private key may be subsequently used in a transfer of information with a recipient of the corresponding discrete log public key.

Figure 5:
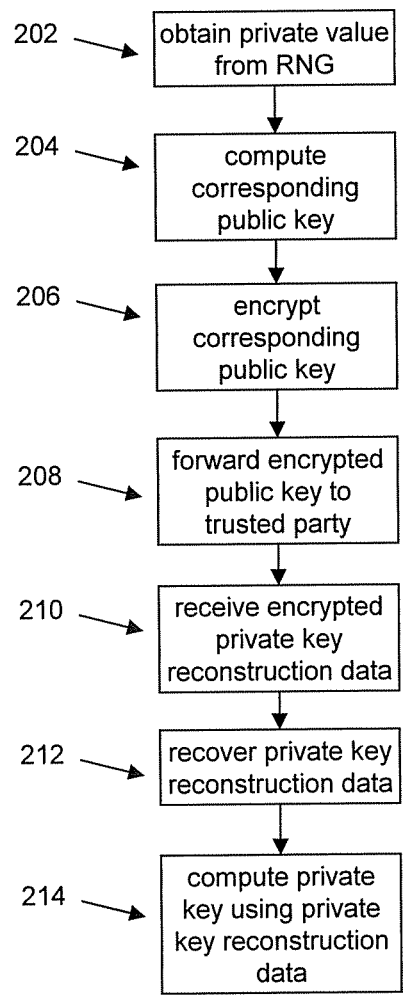
FIG. 5 is a schematic representation of a method of establishing a private key from the perspective of the requestor.
Figure 6:
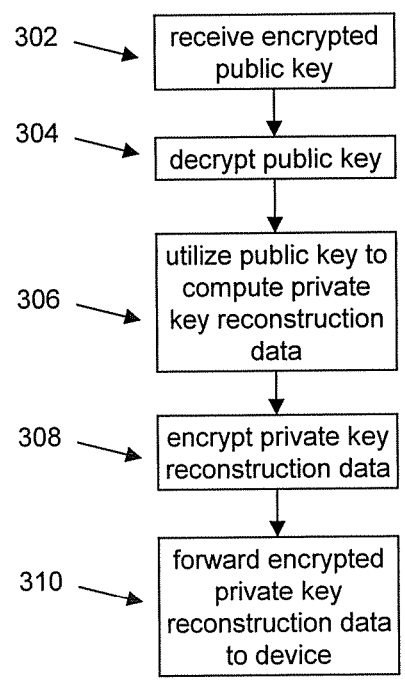
FIG. 6 is a schematic representation of the method of FIG. 5 from the perspective of the trusted party.

FIG. 6 describes the method of FIG. 5 from the perspective of the trusted party. In step 302, the trusted party receives from the device the encrypted public key transmitted in step 208. Then, in step 304, the trusted party decrypts the public key using the deterministic encryption scheme to obtain the public key.

In step 306, the trusted party utilizes the public key to generate the private key reconstruction data, and it is encrypted in step 308.

In step 310, the trusted party forwards the encrypted private key reconstruction data to the device, which uses it as described in steps 210 to 214.

Although the techniques above have been described with reference to certain specific embodiments, various modifications thereof will be apparent to those skilled in the art without departing from the spirit and scope of the claims appended hereto.

The invention claimed is:

1. A method of establishing a private key $k_A$ for use in a public key cryptographic system established between a first correspondent computing device and a second correspondent computing device, each of the first computing device and the second computing device comprising a cryptographic unit to perform cryptographic operations, the method comprising:
a processor of the first correspondent computing device:

a) establishing a private value $x_A$ from an output of a random number generator;
 b) computing a corresponding public key $X_A$ from the private value $x_A$;
 c) encrypting the public key $X_A$ using an encryption scheme and a first public key of a trusted party to establish an encrypted public key $X_A'$;
 d) forwarding the encrypted public key $X_A'$ to the trusted party;
 e) receiving from the trusted party encrypted private key reconstruction data and an implicit certificate, based upon the public key $X_A$ and a trusted party public key $X_{CA}$;
 f) applying a decryption key to recover the private key reconstruction data, the decryption key corresponding to a combination of the private value $x_A$ and a long-term public key $Q_{CA}$ of the trusted party; and,
 g) computing the private key $k_A$ from the private key reconstruction data, the private key $k_A$ being a discrete log private key corresponding to the long-term public key $Q_{CA}$ of the trusted party;
 whereby the first correspondent computing device may use the private key $k_A$ in a transfer of information including the implicit certificate with the second correspondent computing device, and whereby the second correspondent computing device may receive the implicit certificate and recover a first computing device public key $Q_A$ from the implicit certificate and the long-term public key $Q_{CA}$.

2. The method according to claim 1, wherein the encryption scheme is an RSA encryption scheme, and wherein the first public key of the trusted party is an RSA public key.

3. The method according to claim 1, wherein the implicit certificate contains public key reconstruction data and an identity of the first correspondent computing device.

4. The method according to claim 3, wherein the private key reconstruction data is a combination of the implicit certificate, an ephemeral private key $x_{CA}$ of the trusted party and a long-term private key $k_{CA}$ of the trusted party.

5. The method according to claim 4, wherein the private key reconstruction data has the form $ex_{CA}+k_{CA}$ (mod n), wherein: e is a hash of the implicit certificate, and wherein n is the order of a group over which the cryptographic system is implemented.

6. A computing device for use in a cryptographic system to exchange information with other devices using public key cryptographic protocols, the device comprising:
 a cryptographic unit having a random number generator;
 a memory to store parameters of the cryptographic system; and
 an arithmetic logic unit to perform cryptographic operations,
wherein the cryptographic unit is operable to:
 generate a private value $x_A$ from an output of the random number generator;
 compute a corresponding public key $X_A$ from the private value $x_A$;
 encrypt the public key $X_A$ with an encryption scheme, the encrypted public key $X_A'$ encrypted using a first public key of a trusted party;
 forward the encrypted public key $X_A'$ to the trusted party;
 receive encrypted private key reconstruction data and an implicit certificate from the trusted party;
 apply a decryption key to recover the private key reconstruction data, the decryption key corresponding to a combination of the private value $x_A$ and a long-term public key $Q_{CA}$ of the trusted party; and, obtain therefrom a private key $k_A$, the private key $k_A$ being a discrete log private key corresponding to the long-term public key $Q_{CA}$ of the trusted party;

whereby the device may use the private key $k_A$ in a transfer of information including the implicit certificate with a second correspondent computing device.

7. The computing device according to claim 6, wherein the first public key of the trusted party is an RSA public key of the trusted party stored on the memory.

8. The computing device according to claim 6, wherein the first public key of the trusted party is a discrete log public key.

9. A non-transitory computer readable storage medium comprising computer executable instructions for establishing a private key $k_A$ for use in a public key cryptographic system established between computing devices, each computing device having a cryptographic unit to perform cryptographic operations, the non-transitory computer readable storage medium comprising instructions for:

establishing at one of the devices a private value $x_A$ from an output of a random number generator;

computing a corresponding public key $X_A$ from the private value $x_A$;

encrypting the corresponding public key $X_A$ using an encryption scheme with a first public key of a trusted party to establish an encrypted public key $X_A'$;

forwarding the encrypted public key to the trusted party;

receiving from the trusted party encrypted private key reconstruction data and an implicit certificate, the implicit certificate based upon the corresponding public key $X_A$ and a trusted party public key $X_{CA}$;

applying a decryption key to recover the private key reconstruction data, the decryption key corresponding to a combination of the private value $x_A$ and a long-term public key $Q_{CA}$ of the trusted party; and, computing the private key $k_A$ from the private key reconstruction data, the private key $k_A$ being a discrete log private key corresponding to the long-term public key $Q_{CA}$ of the trusted party, whereby the device may use the private key $k_A$ in a transfer of information with another computing device including the implicit certificate, and whereby the other computing device able to receive the implicit certificate and recover a device public key $Q_A$ from the implicit certificate and the long-term public key $Q_{CA}$.

* * * * *